United States Patent [19]
Grigoriev

[11] Patent Number: 5,501,648
[45] Date of Patent: Mar. 26, 1996

[54] FRONT WHEEL DRIVE BICYCLE EXERCISE DEVICE

[76] Inventor: Nikita Grigoriev, East James St., Richfield Springs, N.Y. 13439

[21] Appl. No.: 276,481

[22] Filed: Jul. 15, 1994

[51] Int. Cl.⁶ .............................. A63B 21/00; A61H 1/02
[52] U.S. Cl. .................................. 482/57; 482/62
[58] Field of Search .................. 482/57, 62, 63, 482/64, 65, 58–59; 280/234, 246

[56] References Cited

U.S. PATENT DOCUMENTS

| 682,953 | 9/1901 | Norton . | |
|---|---|---|---|
| 1,549,854 | 8/1925 | Coffman | 280/234 |
| 2,183,471 | 12/1939 | Steele | 280/234 |
| 4,436,097 | 3/1984 | Cunningham . | |
| 4,700,962 | 10/1987 | Salmon | 482/62 |
| 4,705,269 | 11/1987 | De Boer et al. | 482/62 |
| 4,811,964 | 3/1989 | Horn | 280/246 |
| 4,871,164 | 10/1989 | Tseng . | |
| 5,211,613 | 5/1993 | Friesl . | |
| 5,272,928 | 12/1993 | Young | 482/62 |
| 5,308,097 | 5/1994 | Bono et al. . | |
| 5,356,356 | 10/1994 | Hildebrandt et al. | 482/62 |

FOREIGN PATENT DOCUMENTS

| 3126075 | 10/1982 | Germany . |
| 4132794 | 4/1993 | Germany . |
| 17835 | of 1894 | United Kingdom . |

Primary Examiner—Stephen R. Crow
Attorney, Agent, or Firm—Schmeiser, Olsen & Watts

[57] ABSTRACT

A front wheel drive bicycle exercise device including a front wheel and a reciprocating handlebar assembly attached to a frame. A clutch and a mechanical advantage device are utilized to drive the front wheel of the bicycle in response to the reciprocative displacement of the handlebar assembly.

5 Claims, 4 Drawing Sheets

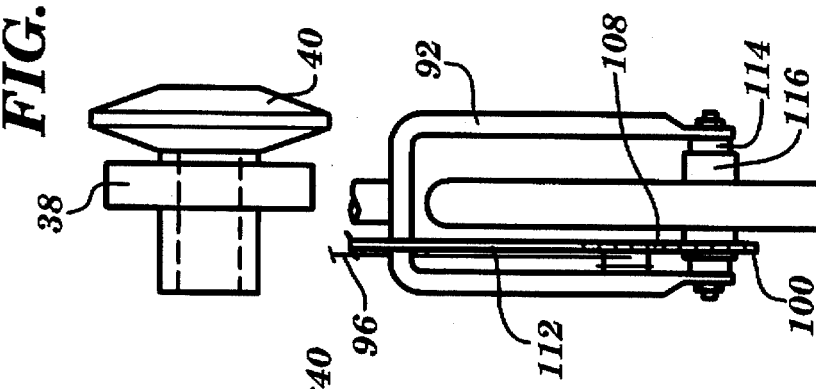
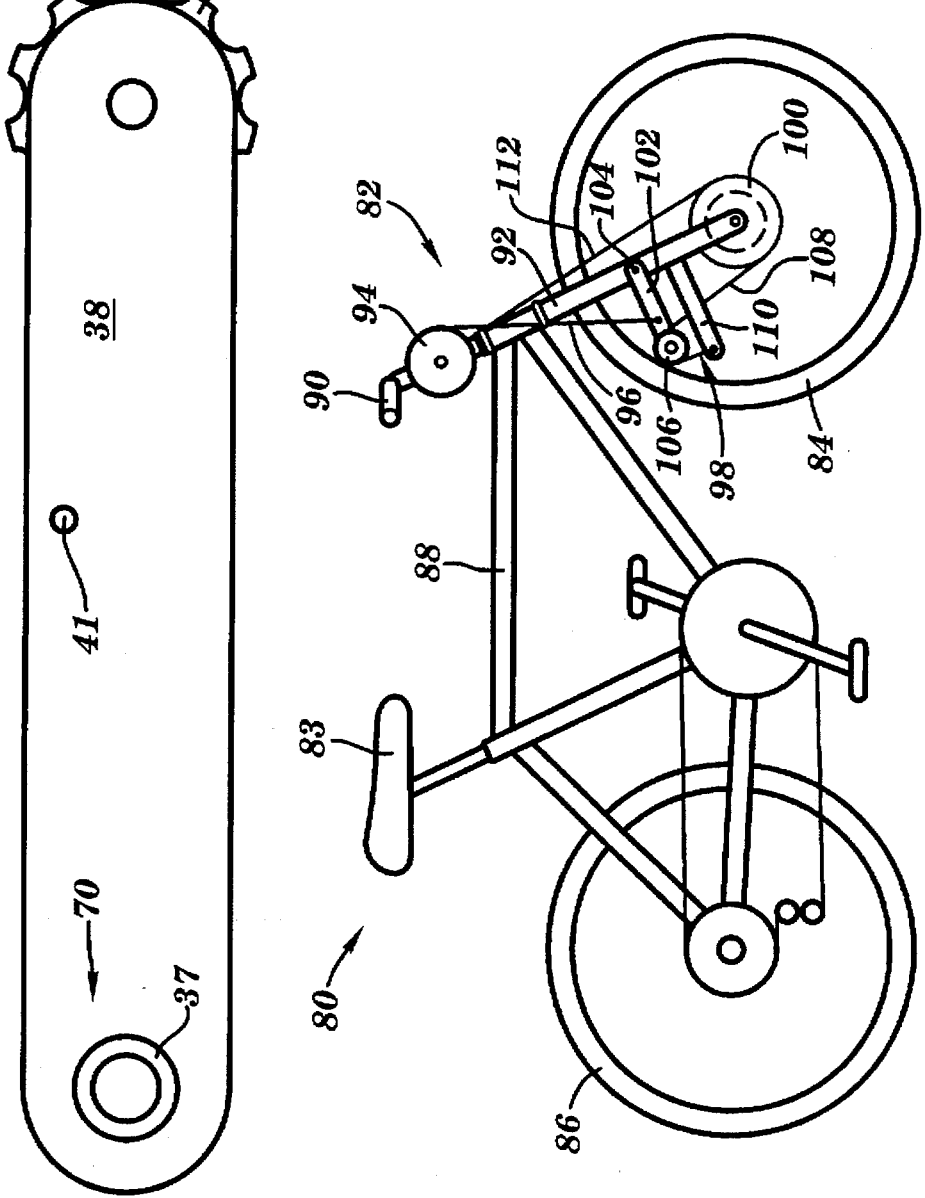

FRONT WHEEL DRIVE BICYCLE EXERCISE DEVICE

FIELD OF THE INVENTION

The present invention relates generally to exercise equipment. In particular, the present invention is concerned with a front wheel drive mechanism for a bicycle to provide exercise to the user.

BACKGROUND OF THE INVENTION

Heretofore, various front wheel drives have been used on bicycles, tricycles, and other exercise equipment. U.S. Pat. No. 682,953 to Norton discloses an auxiliary, hand actuated device for increasing the speed of bicycles, tricycles, and the like. The hand actuated device is used in combination with, or in lieu of, the conventional foot pedals generally employed to propel a bicycle in a forward direction. A pivotal handlebar is connected to the front fork for driving a spring drum or pulley.

U.S. Pat. No. 5,308,097 to Bono et al. discloses a reciprocating handlebar for converting the front idle wheel of a bicycle into a drive wheel. The handlebar is fixed to a lever hinged in front of and on top of the bicycle frame. The handlebar is fixed to the lever together with a catch, having a mobile stopping tooth which cooperates with a stopping means attached to the steering column of the bicycle, to block/release the handlebar. A transmission assembly, comprising a chain which engages a free wheel coaxially fixed to the front wheel of the bicycle, transmits the reciprocating movement of the handlebar to the free wheel, thereby rotating the front wheel.

German Offenlegungsschrift 4,132,794 to Scheuermann discloses a front wheel drive for bicycles that has a front bar section between the handlebars and steering column that permits a turning movement of the handlebars relative to the steering column. The pivoting movement of the handlebars is transmitted to the front wheel hub, rotating the front wheel of the bicycle.

UK Patent 17,835/1894 to Clement discloses a front wheel drive bicycle having a rod hinged to either side of the handlebar. The rod is connected to a crank secured to a shaft passing through the hub of the front or steering wheel of the bicycle.

German Offenlegungsschrift 3,126,075 to Lehmann discloses a front wheel auxiliary drive for a bicycle. The front wheel drive has horizontally hand operated pivot levers for driving cranks linked to a separate freewheel chain drive.

The above prior art summaries are merely representative of portions of the inventions disclosed in each reference. In no instance should these summaries substitute for a thorough reading of each individual reference.

One of the difficulties of the prior art devices that use reciprocating handlebars is that they require a great angular distance of rotation. The great angular distance of rotation creates the possibility of the user being thrown off balance by the wide sweeping movement of the handlebar.

Another difficulty with prior art devices which use a clutch to propel the front wheel is that when the clutch recoils, a loud banging sound occurs when a pawl wheel catches up with the tooth wheel, or vice versa, in the rachet of the clutch.

Another disadvantage of the prior art devices is that the gear ratio between the handlebars and the front wheel drive mechanism is constant and cannot be varied through gearing.

SUMMARY OF THE INVENTION

The present invention includes all the advantages of the prior art, while overcoming the disadvantages thereof. The present invention includes an exercise device or a bicycle having a front wheel drive mechanism. The front wheel drive mechanism includes a mechanical advantage device or multiplier system which magnifies the torque applied by a user pulling on the handlebars, and applies the magnified torque to the front wheel of the bicycle or exercise device.

Another aspect of the present invention is that the front wheel drive mechanism has a gear shift mechanism included therewith. The gear shift mechanism varies the gears such that higher and lower gear ratios may be used while driving the front wheel drive of the exercise device or bicycle.

Another aspect of the present invention is that it includes a shock absorber such that when the clutch catches up with the front, driven wheel of the exercise device, the resultant impact and associated loud banging sound commonly experienced in the prior art will be dampened by the shock absorber.

BRIEF DESCRIPTION OF THE DRAWINGS

These and other advantages of the present invention will become readily apparent upon reading the following detailed description and upon reference to the drawings in which:

FIG. 5 is a plan view of the chain drive sprocket pivot arm of the present invention;

FIG. 6 is a front view of the chain drive sprocket arm of the present invention;

FIG. 7 illustrates a bicycle incorporating the front wheel drive mechanism of the present invention, wherein the front wheel hub includes an internal gear shift; and FIG. 8 is a front view of the bicycle of FIG. 7.

DETAILED DESCRIPTION OF THE PREFERRED EMBODIMENTS

Figure 1:
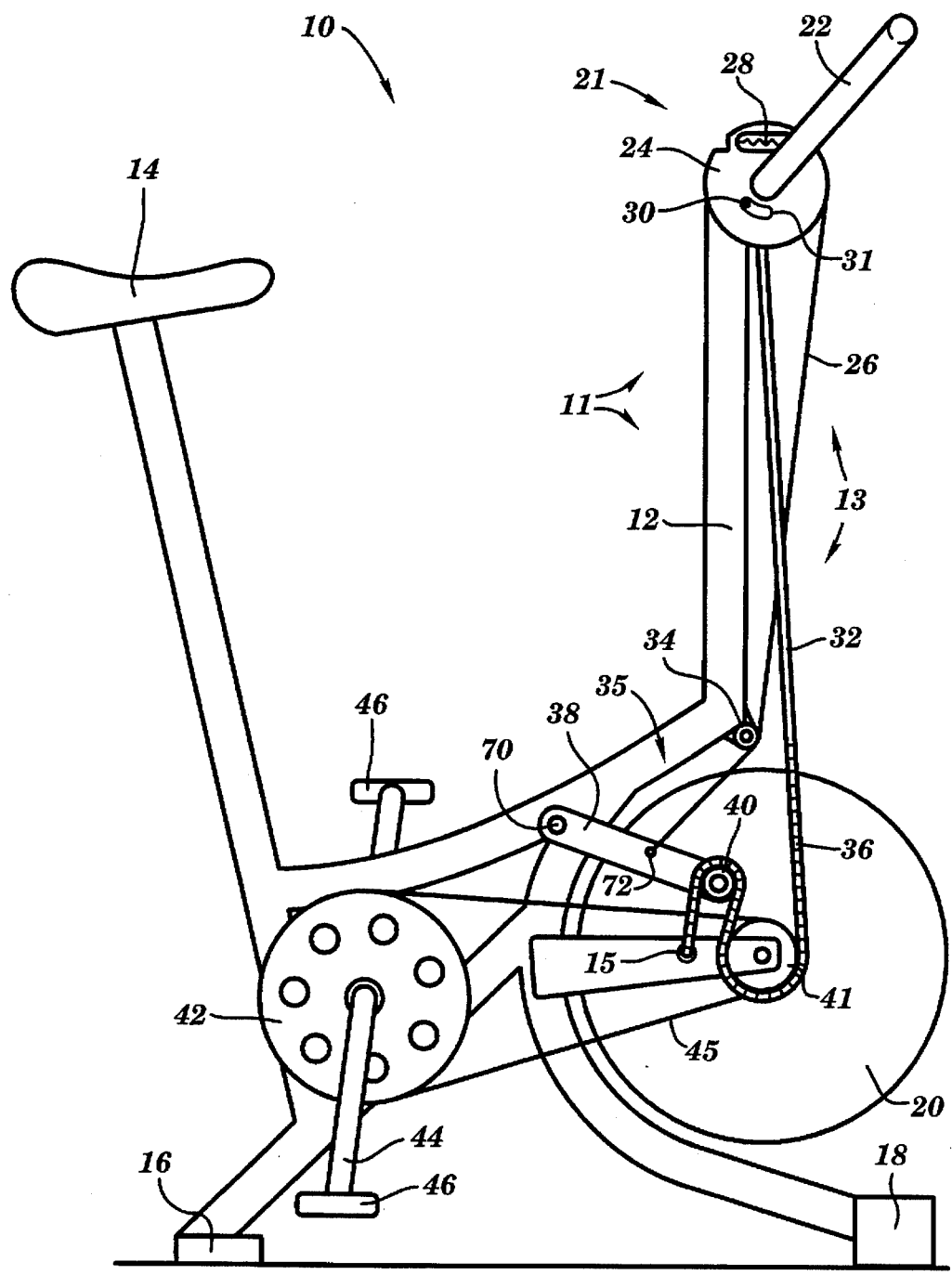
FIG. 1 is a side view of the front wheel drive mechanism of the present invention.

An exercise mechanism 10 is illustrated in FIG. 1. The exercise mechanism 10 includes a front wheel device 11. In accordance with a preferred embodiment of the present invention, the exercise mechanism 10 generally takes the form of a stationary exercise bicycle. Of course, the front wheel device 11 may be used on other types of exercise devices, or may be utilized in conjunction with manually propelled land vehicles such as bicycles, tricycles, wheelchairs or the like.

The exercise device 10 includes a frame 12, a seat 14, a rear base 16, a front base 18, and a front wheel 20. Preferably, the front wheel is a fly wheel. However, other types of front wheels may be used such as a tire, a fan (air resistance) wheel or the like. As shown in FIG. 1, the front wheel 20 is connected to pedals 46, each having a crank arm 44 which rotates a foot pedal drive sprocket 42.

Figure 2:
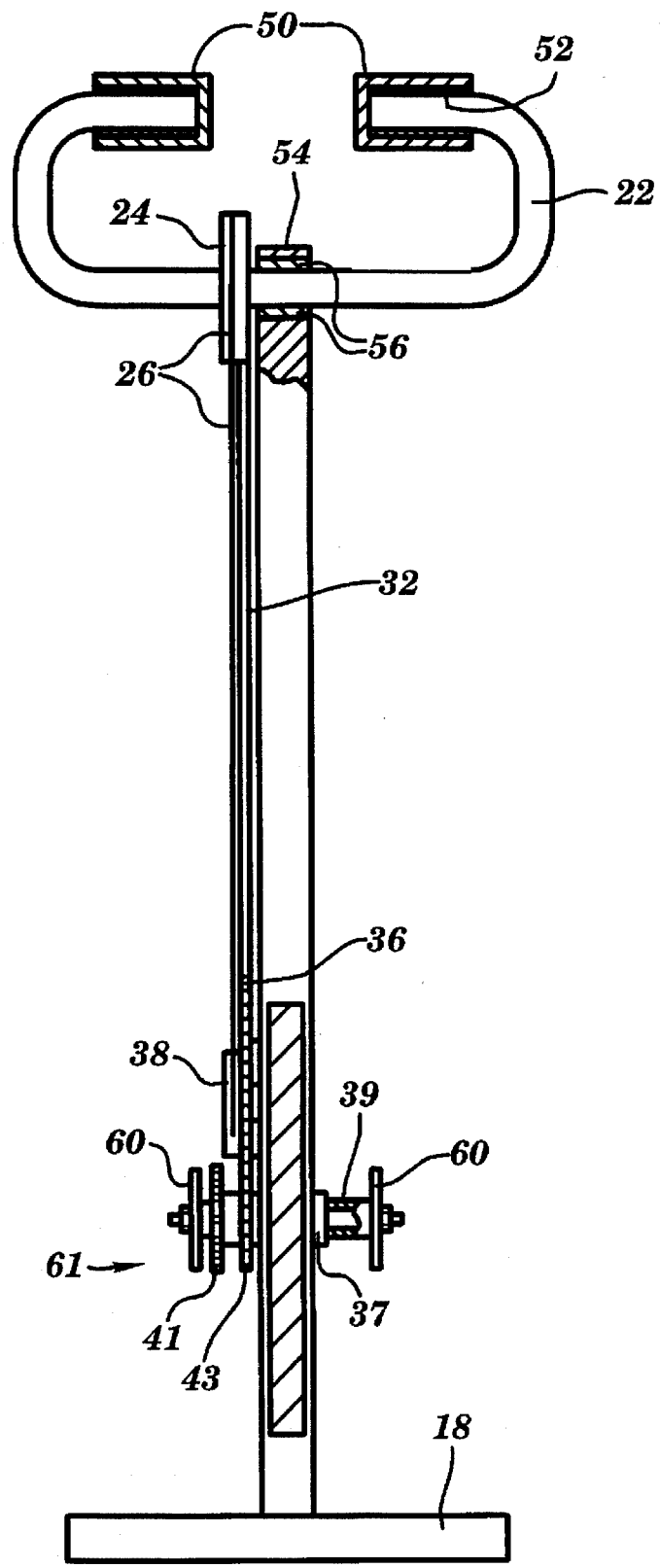
FIG. 2 is a front view of the front wheel drive mechanism of the present invention.

The front wheel drive mechanism 11 includes a reciprocating handlebar assembly 21, a cabling assembly 13, a mechanical advantage device or multiplier 35, and a driven assembly 61 (FIG. 2).

The reciprocating handlebar assembly 21 includes handlebars 22 attached to a handlebar mounted cable drive pulley or driving element 24. In FIG. 1, the handlebar cable drive pulley 24 is illustrated as being circular, however other moment arms are contemplated. For example, a lever or the like may be used for transmitting an increased torque to an elongate member 26.

Figure 3:
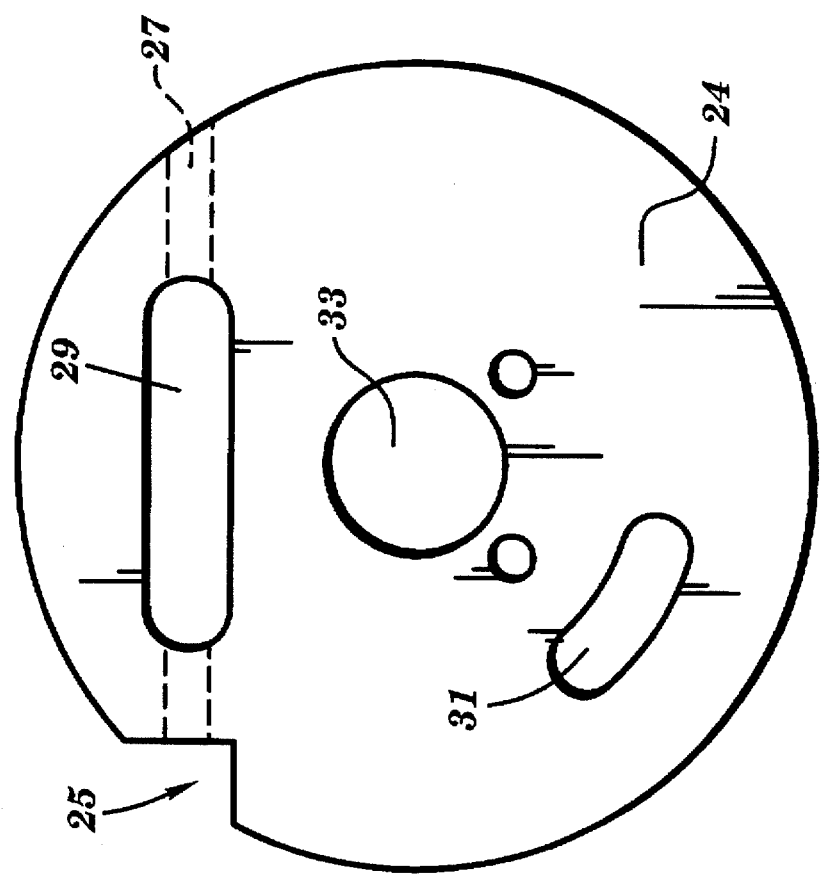
FIG. 3 is a plan view of the handlebar cable drive pulley of the present invention.

As shown in FIG. 3, the handlebar mounted drive pulley 24 includes a cable attachment notch 25, a shock absorber slot 29, a cable guide 27, a central hole 33, and a travel limit slot 31. The elongate member 26 has a first end mounted to a shock absorber 28 fitted within slot 29. The shock absorber 28 is preferably a coil spring, however, pneumatic and hydraulic cylinders or other damping members may be used.

The shock absorber 28 decreases the impact effect of clutch engagement (discussed hereinbelow). The impact effect produces a loud banging sound when a wheel, turning for example at 50 to 100 rpms, is impacted with a clutch operating at 200 rpms. Advantageously, the shock absorber 28 dampens this undesirable effect.

The travel limit slot 31 has the advantage of limiting the travel of the handlebars 22 within a given range. Specifically, a stop pin 30, rigidly attached with respect to frame 10, is utilized to engage opposing ends of the travel limit slot 31 during the reciprocating motion of the handlebars 22. Other types of stops and limiters may also be used to limit the rotation of the handlebars 22.

Figure 4:
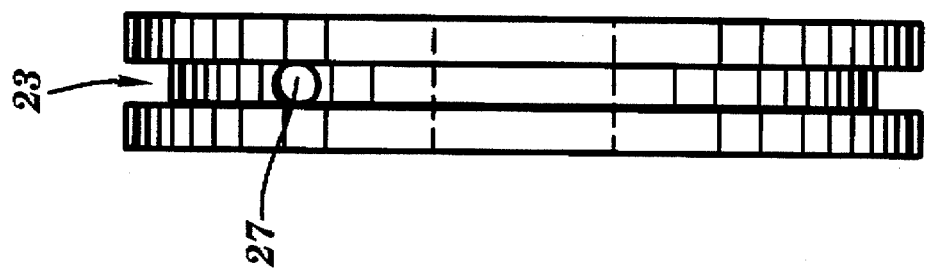
FIG. 4 is a front view of the handlebar cable drive pulley of the present invention.

The elongate member 26 is mounted to the handlebar cable drive pulley 24 in a groove 23 (FIG. 4). The elongate number 26 attaches to the shock absorber spring 28 through the cable guide 27. The opposite end of the shock absorber 28 has an attachment device for fixing the shock absorber into the cable attachment notch 25.

The handlebar assembly 22 as shown in FIG. 2 includes swivel hand grips 50, each mounted to the handlebar assembly 22 by a bushing 52. The handlebar 22 is mounted to the frame 12 by a clamp 54. The clamp 54 has a bearing 56, preferably comprising a needle bearing assembly or a ball bearing assembly mounted between the clamp 54 and the handlebars 22.

The elongate member 26 is used to transmit a pulling force from the handlebar 22 and the handlebar assembly 21 to the mechanical advantage or multiplier device 35. The elongate member 26 preferably comprises a cable. However, the elongate member 26 may be a cord, rod, rope, line, chain, wire, tendon, twisted strand, or the like.

The elongate member 26 wraps around a guide pulley 34, and is connected to the chain drive sprocket pivot arm 38 at the cable attachment point 72. As the elongate member 26 is pulled, it provides a mechanical advantage through the pivot arm 38, to the clutch 43. The pivot arm 38 is attached to a pivot 70 having bushing 37. On the opposite end of the pivot arm 38 is a chain drive sprocket 40. The chain drive sprocket 40 is engaged with a handlebar driven chain 36. The handlebar driven chain 36 may be made of any of the materials described above with regard to the elongate member 26.

A first end of the handlebar driven chain 36 is attached to the frame 12 at attachment point 15. Moving along the chain 36 from the attachment point 15, the handlebar driven chain 36 sequentially engages the chain drive sprocket 40 and a handlebar driven clutch 43. On an end of the handlebar driven chain 36 is a biasing device 32 such as a spring, elastic cord, or other device, for recoiling the chain 36.

Referring now to FIG. 2, the driven assembly 61 includes a plurality of clutch mechanisms 41, 43. The clutch mechanisms 41, 43 may be any rotational energy transfer device such as a ratchet, annular dog assembly, inertial clutch, friction plate, sprocket, spindle, roller clutch (manufactured by INA Bearing Company of Fort Mill, S.C.), or the like. In the preferred embodiment, each clutch mechanism 41, 43 has the same axis of rotation as the front wheel 20, and essentially allows free wheeling in a first direction and engagement of the front wheel 20 in a second direction. Other embodiments of the mounting of the clutch mechanisms 41, 43 are contemplated, wherein the axis of rotation of one or both of the clutch mechanisms 41, 43 differs from the axis of rotation of the front wheel 20. As indicated in FIG. 2, the front wheel 20 and clutch mechanisms 41, 43 are coaxially mounted to a common hub 39.

The clutch mechanism 41 is a pedal driven rachet sprocket which is driven by the foot pedal drive sprocket 42. A chain 45, which may be made from any elongate member such as those used for elongate member 26, encircles the foot pedal drive sprocket 42 and the clutch mechanism 41. Preferably, internal of each clutch mechanism 41, 43, is a pawl wheel and a tooth wheel (not shown). Alternately, the clutch mechanisms 41, 43 may utilize internal biasing devices such as a spring drum in lieu of the externally mounted biasing device 32.

The clutch mechanism 43 is driven by the handlebar assembly 21. The clutch mechanism 41, previously described as being driven by the foot pedals 46, operates independently of the clutch mechanism 43. The clutch mechanisms 41, 43 are attached so that they may free wheel independently of one another in a first direction. The clutch mechanisms 41, 43 may also be used independently or in combination to engage the front wheel 20 such that it may be driven in a second, opposing direction.

As shown in FIG. 2, the hub 39 may also include an internal gear shift 37 of any type known in the art. Other types of gear shifts, such as external sprockets having a derailleur, are also contemplated for use with the front wheel drive exercise device or bicycle. A guard 60 is disposed proximate the opposing ends of the hub 39.

A bicycle 80, incorporating a front wheel drive mechanism 82, is illustrated in FIGS. 7 and 8. Generally, the front wheel drive mechanism 82 operates in a manner similar to that of the above-described front wheel device 11.

The bicycle 80 includes a seat 83, a front wheel 84, a pedal driven rear wheel 86, a frame 88, a reciprocating handlebar assembly 90 and a front fork 92. The front wheel drive mechanism 82 utilizes a handlebar mounted drive pulley 94 and an elongate member 96 to transmit a pulling force from the reciprocating handlebar assembly 90, through a mechanical advantage device 98, to a front wheel clutch mechanism 100. The front wheel clutch mechanism 100, preferably comprising a pawl wheel and a tooth wheel (not shown), is designed to allow free wheeling in a first direction and engagement of the front wheel 84 in a second, opposing direction.

As shown in FIG. 7, the elongate member 96 is secured to an intermediate section of a chain drive sprocket pivot arm 102. The chain drive sprocket pivot arm 102 is pivotally secured to the front fork 92 at pivot point 104. A chain drive sprocket 106 is disposed on an opposing end of the pivot arm.

The front wheel clutch mechanism 100 is coupled to the mechanical advantage device 98 by a drive chain 108. A first end of the drive chain 108 is secured to a distal end of a front fork extension 110. The opposing end of the drive chain 108 is attached to a biasing spring 112. The drive chain 108 engages the chain drive sprocket 106 and the front wheel clutch mechanism 100.

As illustrated in FIG. 8, the front wheel 84 and the front wheel clutch mechanism 100 are coaxially mounted to a common hub 114. Of course, the front wheel clutch mechanism 100 and the front wheel 84 may be mounted to have disparate axes of rotation. The front wheel 84 and the hub 114 may also include an internal gear shift 116 of any type known in the art. As in the previous embodiment of the present invention, other types of gear shifts, such as external sprockets having a derailleur, are also contemplated for use with the bicycle 80.

The embodiments disclosed herein have been discussed for the purpose of familiarizing the reader with the novel aspects of the invention. Although preferred embodiments of the invention have been shown, many changes, modifications and substitutions may be made by one having ordinary skill in the art without necessarily departing from the spirit and scope of the invention as described in the following claims.

What is claimed is:

1. Apparatus comprising:

a front wheel and a reciprocating handlebar assembly attached to a frame;

a first clutch and a second clutch mounted for driving said front wheel;

a drive pulley mounted to said handlebar assembly, wherein said drive pulley includes a slot for limiting rotation of said drive pulley;

a first elongate member, connecting said first clutch to said drive pulley, whereby said reciprocating handlebar assembly, in conjunction with said drive pulley, is adapted for driving said first clutch; and a second elongate member, connecting said second clutch to a pedal crank assembly, whereby the pedal crank assembly is adapted for driving said second clutch.

2. The apparatus of claim 1, wherein said first elongate member includes a shock absorber.

3. The apparatus of claim 2, wherein said shock absorber is mounted in a slot of said drive pulley.

4. A stationary exercise bicycle comprising:

a rotationally resistant front wheel and a seat attached to a frame;

first and second clutch mechanisms coupled to said front wheel;

a foot actuated pedal arrangement having a chain for engaging said first clutch mechanism, thereby rotating said front wheel;

a cabling system extending between a handlebar assembly and said second clutch mechanism, said cabling system including a cable having a first end affixed to said handlebar assembly and a second end operationally coupled to a drive chain, said cabling system further including a displacement multiplier for converting a displacement of said cable into a larger displacement of said drive chain upon a rearwardly directed displacement of said handlebar assembly.

5. The stationary exercise bicycle according to claim 4, wherein said displacement multiplier includes a pivot arm with said cable attached thereto, said pivot arm having a first end pivotally mounted to said frame and a second end operationally engaged to said drive chain, said drive chain being further operationally engaged to said second clutch mechanism.

* * * * *